(12) United States Patent
Kiraly

(10) Patent No.: US 9,737,757 B1
(45) Date of Patent: Aug. 22, 2017

(54) GOLF BALL LAUNCH MONITOR TARGET ALIGNMENT METHOD AND SYSTEM

(71) Applicant: WAWGD, Inc., San Diego, CA (US)

(72) Inventor: Chris Kiraly, San Diego, CA (US)

(73) Assignee: WAWGD, INC, San Diego, CA (US)

( * ) Notice: Subject to any disclaimer, the term of this patent is extended or adjusted under 35 U.S.C. 154(b) by 0 days.

(21) Appl. No.: 15/582,657

(22) Filed: Apr. 29, 2017

Related U.S. Application Data

(60) Provisional application No. 62/422,971, filed on Nov. 16, 2016, provisional application No. 62/453,454, filed on Feb. 1, 2017, provisional application No. 62/477,418, filed on Mar. 27, 2017.

(51) Int. Cl.
*A63B 67/02* (2006.01)
*A63F 7/20* (2006.01)
*A63B 24/00* (2006.01)

(52) U.S. Cl.
CPC .. *A63B 24/0021* (2013.01); *A63B 2024/0031* (2013.01); *A63B 2220/807* (2013.01)

(58) Field of Classification Search
USPC ............... 473/131, 140, 141, 151, 199, 200, 473/219–226
See application file for complete search history.

(56) References Cited

U.S. PATENT DOCUMENTS

| | | | | |
|---|---|---|---|---|
| 7,324,663 B2 * | 1/2008 | Kiraly | ............... | A63B 24/0021 348/169 |
| 7,497,780 B2 * | 3/2009 | Kiraly | ............... | A63B 24/0003 463/42 |
| 7,540,500 B2 * | 6/2009 | Kiraly | ............... | A63B 24/0003 273/317.2 |
| 7,641,565 B2 * | 1/2010 | Kiraly | ............... | A63B 69/3658 473/151 |
| 8,951,138 B2 * | 2/2015 | Kiraly | ..................... | G06T 7/248 473/222 |
| 2006/0008116 A1 * | 1/2006 | Kiraly | ...................... | G06T 7/20 382/103 |
| 2010/0210377 A1 * | 8/2010 | Lock | .................. | A63B 24/0003 473/409 |
| 2011/0292203 A1 * | 12/2011 | Kim | ................... | A63B 24/0021 348/135 |

* cited by examiner

*Primary Examiner* — Nini Legesse
(74) *Attorney, Agent, or Firm* — Manuel de la Cerra

(57) ABSTRACT

A golf ball launch monitor is disclosed that may be used with an alignment stick. The monitor has a default alignment and an image sensor adapted to capture an image of the alignment stick and communicate that image to a processor. The processor is configured to perform the following steps: (a) detect a horizontal edge within the image representative of the alignment stick by detecting large contrast changes; (b) convert each edge to a vector that starts at the sensor's focal point and projects into space based on the sensor's calibration; (c) locate the plane formed by the vectors by applying standard outlier removal and best fit analysis (d) determine the intersection of the plane and an earth tangential plane; and (e) calculate an azimuth alignment angle offset based on the line and the monitor's default alignment. The calculated azimuth alignment angle can then be used to adjust ball flight trajectory calculations.

24 Claims, 9 Drawing Sheets

GOLF BALL LAUNCH MONITOR TARGET ALIGNMENT METHOD AND SYSTEM

CLAIM OF PRIORITY

This application claims priority to U.S. provisional application No. 62/422,971, entitled "GOLF BALL LAUNCH MONITOR ALIGNMENT METHOD AND SYSTEM", which was filed on Nov. 17, 2016, priority to U.S. provisional application No. 62/453,454, entitled "GOLF BALL LAUNCH MONITOR TARGET ALIGNMENT METHOD AND SYSTEM" which was filed on Feb. 1, 2017, and priority to U.S. provisional application No. 62/477,418, entitled "GOLF BALL LAUNCH MONITOR TARGET ALIGNMENT METHOD AND SYSTEM" which was filed on Mar. 27, 2017, the contents of all of these applications are incorporated herein by reference.

TECHNICAL FIELD

This invention relates to a golf ball measurement systems. More particularly, the invention relates to method and system to align a golf ball launch monitor with a target such as the golf pin.

BACKGROUND

A golf ball launch monitor is an electronic device for assisting a golfer in improving his or her game. More particularly, the monitor is used to analyze the initial path of the golf ball after it is struck by a golf club, and to present to the golfer the likely flight path information for the ball. Typically, the flight path information will include ball speed, ball direction, spin, and a projected flight path or distance. The launch monitor typically has an imager which couples to a processor and display. The imager is placed close to where the golfer is expected to hit the ball, with the imager's sensor directed toward the ball or tee.

Usually the golfer manually aligns the monitor to the target before use. The monitor, based on the initial flight parameters and its current alignment, calculates the flight characteristics of the golf ball including the ultimate position of the ball. Such a monitor is described in various previous patent applications by the inventor of the present invention, including U.S. Pat. No. 7,324,663 entitled "Flight Parameter Measurement System" issued on Jan. 29, 2009, U.S. Pat. No. 7,292,711 entitled "Flight Parameter Measurement System" issued on Nov. 6, 2007, U.S. Pat. No. 7,641,565 entitled "Method and Apparatus For Detecting The Placement of a Golf Ball for a Launch Monitor" issued on Jan. 5, 2010, U.S. Pat. No. 7,497,780 entitled "Integrated Golf Ball Launch Monitor" issued on Mar. 3, 2009, U.S. Pat. No. 7,540,500 entitled "Foldable Launch Monitor For Golf" issued on Jun. 2, 2009, and U.S. Pat. No. 8,951,138 entitled "Golf Club Head Measurement System" issued on Feb. 10, 2015, the contents of all of these patents are incorporated herein by reference in their entireties.

A desirable parameter is the left and right trajectory of the ball typically referred to as azimuth. The azimuth is one of the most important parameters in determining if the ball will end up close the desired target, other factors include ball velocity, spin, launch angle and wind. For an optical system, the measurement is typically made relative to the exterior housing of the launch monitor. Because the golfer is attempting to reach the target (e.g. the pin), the monitor must be aligned with the target to accurately model the flight path of the ball and its ultimate position; thus without proper azimuth alignment, the monitor's calculations of the ball flight will be inaccurate. Typically, the user aligns the front housing of the monitor to be parallel to a linear path that reaches the target. The monitor bases it calculations on the assumption that it is aligned with the target. But the monitor housing can be relatively narrow (less than 10 inches) so even a diligent alignment may be off by several degrees. Such an error at a tee-box can result in a very large error at the green. More commonly, the user does not take care to have the most accurate alignment possible, simply pulling the monitor out of his golf bag and setting up with a rough alignment.

What is needed, therefore, is a system and method that allows a user to easily and accurately align a golf ball launch monitor, such that the monitor can use the azimuth alignment correction as part of its calculations to arrive at a more accurate ball flight trajectory.

SUMMARY OF THE INVENTION

Disclosed herein is a system and method for aligning a golf ball launch monitor. The monitor has a default alignment and an image sensor adapted to capture an image of the alignment stick and communicate that image to a processor. The processor is configured to perform the following steps: (a) detect a horizontal edge within the image representative of the alignment stick by detecting large contrast changes; (b) convert each edge to a vector that starts at the sensor's focal point and projects into space based on the sensor's calibration; (c) locate the plane formed by the vectors by applying standard outlier removal and best fit analysis; (d) determine the intersection of the plane and an earth tangential plane; and (e) calculate an azimuth alignment angle offset based on the line and the monitor's default alignment. The calculated azimuth alignment angle can then be used to adjust ball flight trajectory calculations.

The system and method may be expanded to a monitor with more than one sensor. In this case each image sensor is adapted to capture an image of the alignment stick and communicate that image to a processor. The processor is configured to perform the following steps: (a) detect a horizontal edge within the image representative of the alignment stick by detecting large contrast changes; (b) convert each edge to a vector that starts at the sensor's focal point and projects into space based on the sensor's calibration, perform this for both sensors; (c) locate the planes formed by the vectors by applying standard outlier removal and best fit analysis; (d) determine the intersections of the planes; and (d) calculate an azimuth alignment angle offset based on the line and the monitor's default alignment. The calculated azimuth alignment angle can then be used to adjust ball flight trajectory calculations.

Both the single and multi-sensor systems may check whether the set of edges in step (a) is larger than a predetermine threshold. This helps ensure that the image is not picking up an artifact or other object that is not of sufficient bulk to be the expected alignment stick. And both of these systems may also check the calculated azimuth alignment angle offset against a predetermine range to again conform that the item detected in the images is the expected alignment stick.

Other systems, methods, features and advantages of the invention will be or will become apparent to one with skill in the art upon examination of the following figures and detailed description. It is intended that all such additional systems, methods, features and advantages be included within this description, be within the scope of the invention.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION

Figure 1:
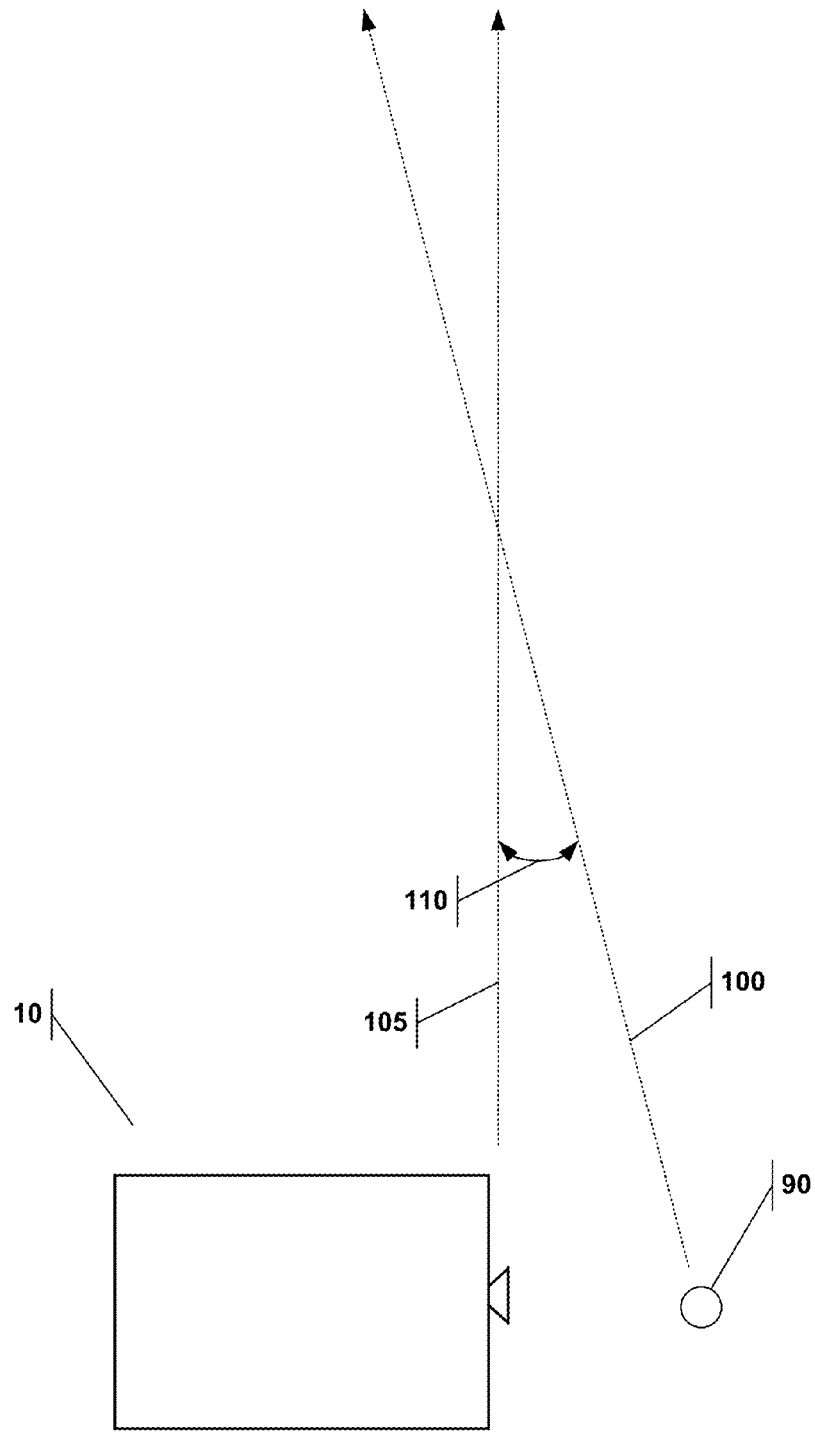
FIG. 1 is a diagram illustrating the difference between the launch monitor's default alignment and the true heading of the target.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1-7E and is provided for ease of reference, where like reference numerals designate corresponding features throughout the specification and figures:

Launch monitor 10
Processor 15
Battery 20
Image Sensor(s) 25, 25-1, 25-2
Lights 30, 35
Alignment Search Indicator 40
Aligned Indicator 45
Ball Search Indicator 50
Ready Indicator 55
Keypad 60
Display 65
Speaker 70
Microphone 75
Tilt Sensor 78
Sensor Scan Zone 80
Alignment Stick 85
Golf Ball 90
Strike Zone 95
True Heading To Target 100
Monitor's Default Alignment 105
Azimuth Alignment Angle Offset 110
Steps to Method To Detect The Alignment Stick And Performs The Alignment Correction Calculations (Multi-Sensor System) 135-195
Steps to Method To Detect The Alignment Stick And Performs The Alignment Correction Calculations (Single Sensor System) 205-260
Lower Handicap Target Line 302
Higher Handicap Target Line 304
Horizontal Edge 305
Ground 307
Vectors 310-1, 310-2
First Plane 315-1
Second Plane 315-2
Intersection 320

This patent describes a novel method to allow the golfer to establish azimuth alignment of the launch monitor to a down range target. The method uses a golf alignment stick that is already commonly used by golfers. The stick is long a straight and easily fits in a golf bag. In the disclosed method, the golfer simply places the alignment stick into the sensor scan zone (usually by placing the stick on the ground pointing to the target) and the stick is automatically detected by the monitor's sensor system. The golfer is alerted that the stick has been detected by an audible tone, via a display or indicator, and there need not be any requirement that the golfer press any buttons or interact with the launch monitor in any way to finish the azimuth alignment. When the stick is removed, the device will now report ball and club azimuth relative the azimuth of the stick that was previously placed in the sensor can zone. If desired the ball launch angle may also be reported relative to the stick orientation. To more easily be detected by the monitor, the stick may have a retroreflective material; this is the preferred embodiment.

The launch monitor enables an automated process for aligning the monitor, positioning a golf ball in a proper position, indicating to a golfer that the golf ball may be struck, and measuring and presenting flight path information regarding the launched golf ball. Current techniques require trial and error, physical measurements aids or hitting several test shots followed by position or parameter adjustments to establish proper hitting position. Additionally current techniques are prone to false or failed triggering due to unwanted external stimulus or variations in ball-club contact.

The launch monitor is preferably constructed as a unitary portable device capable of being used in multiple locations. For example, the launch monitor may be used at a driving range, a chipping location, a putting green, an indoor practice facility, or a cruise ship. It would be apparent that the launch monitor is certainly not limited to these venues. Typically, a golfer will use the launch monitor for providing immediate feedback as to the golfer's swing performance. Also, the launch monitor is constructed in a way that allows a golfer to use standard golf balls, practice golf balls, range balls, and their usual golf clubs. In this way, no special equipment or set up is required for the golfer to obtain the benefits of the launch monitor.

Advantageously, the launch monitor may be quickly and easily setup and prepared for use, and requires minimal input from the golfer. In some cases, the launch monitor may be used with no golfer input at all. Further, the launch monitor works with nearly any golf ball, and with any club: putters, chippers, short irons, long irons, woods, and drivers. For example, a golfer can place the launch monitor next to a driving range tee, activate it, place a ball, and hit the ball with any club. The golfer need not tell the monitor what type of ball is being hit, or which club will be used. The golfer does not even need to tell the monitor if the type of hit will be a chip or drive. This ease of use allows a golfer to concentrate on their golf practice, without the burden of setting configurations.

The launch monitor may be used as an instructional aide at a practice driving range. However, it will be understood that the launch monitor may be advantageously used for several purposes, such as, but not limited to, chipping instruction, putting instruction, club fitting and as an input device for a golf simulation game or computer. The launch monitor may be constructed in a case for positioning on the ground near a hitting area at a driving range. Often, the hitting areas at driving ranges are set apart separate spaces for each golfer, and may have mats of artificial grass or dividers between areas. In other arrangements, the hitting area may be more free-form, allowing golfers more flexibility in positioning themselves and the launch monitor. In most driving ranges, space is limited, so the launch monitor may be positioned within a foot or two of where the golfer would expect to drive the ball from.

FIG. 1 illustrates the placement of a monitor 10 alongside of the ball 90. The true heading to the target is shown by arrow 100, while the monitor's default alignment is shown by arrow 105. The azimuth alignment angle offset 110, is in this case, about 22 degrees. This offset limits the amount of instruction that the monitor can give to the user. Without having a true heading of the intended target, the monitor cannot, for example, provide deviation from the intended golf ball flight path information. And this can be helpful for a user, because it can indicate to the user starting the shot left or right of the target line.

Figure 2:
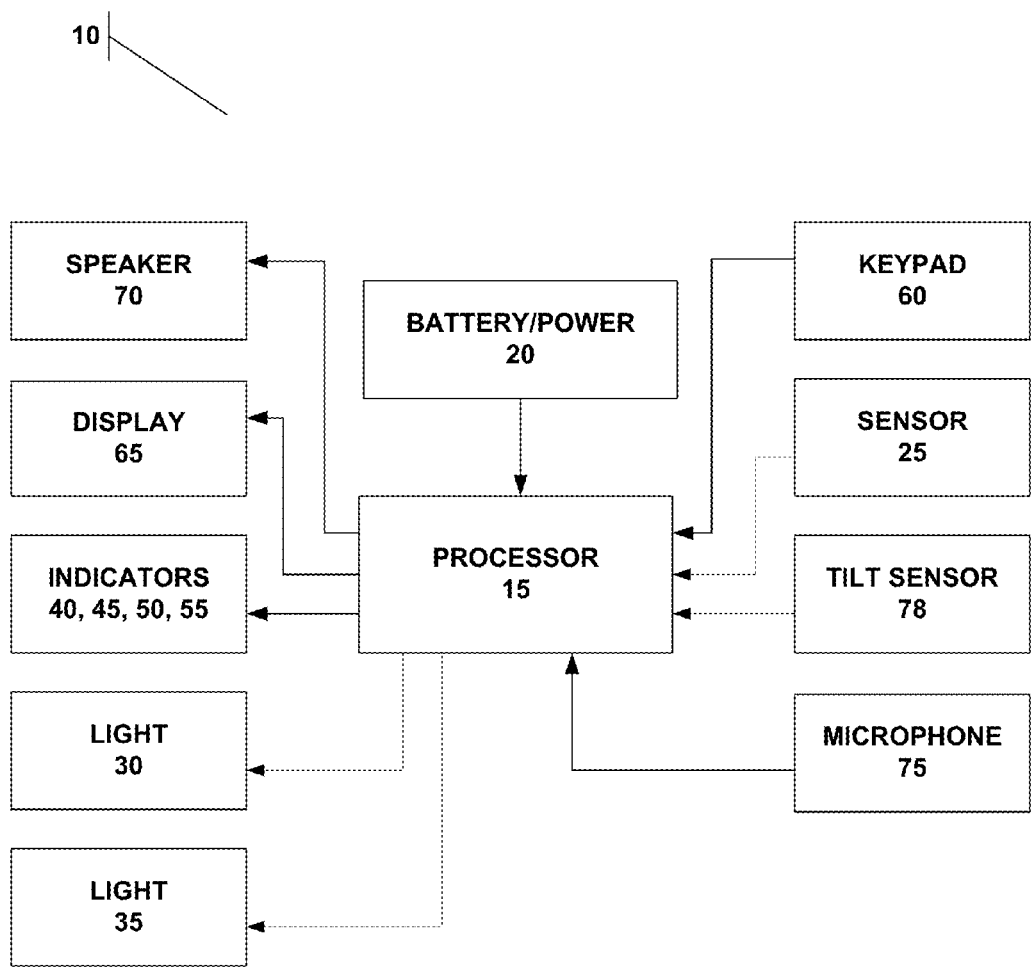
FIG. 2 is a schematic of the various components of a launch monitor.

Now the system and method for determining the azimuth alignment correction will be discussed. FIG. 2 illustrates the various components of a launch monitor 10. The monitor 10 may include a processor 15 that is connected to input devices such as a sensor 25 that can detect the movement and placement of a golf ball, a microphone 75 for detecting the distinctive sound of a golf ball strike, a tilt sensor 78 for calibrating the launch monitor 10 to earth tangential (i.e., level) and a keypad 60 into which the user may input information or control the processor 15. Some or all of these input devices may be used. It is also advantageous that the sensor 25 actually comprise two sensors to have stereoscopic view of the image scan zone, which increases the accuracy of the monitor's calculations. The monitor may also have lights 30 and 35 to illuminate the strike zone so that the sensor 25 can generate clear images that can be processed. These lamps may be in the visible light spectrum, or may be in another spectrum such as the infrared spectrum. These lamps may be used to provide assistance when ambient light is particularly low, or may be used to facilitate the use of a lower-cost CMOS shutter system. The processor 15 may output information to a display 65 such as an LCD screen or the like, indicators 40, 45, 50, 55 and a speaker 70. Some or all of these information output devices may be used. It will be appreciated that more sophisticated lights, lamps, LCD displays, and audible indicators may be used.

The processor 15 may be configured to perform several calculations which include detecting the placement of the ball (as disclosed for example in U.S. Pat. Nos. 7,641,565 and 7,497,780), calculating the flight parameters (as disclosed for example in U.S. Pat. No. 7,324,663), aligning the device relative to earth tangential (as disclosed for example in U.S. Pat. No. 7,292,711), and calculating the position of the golf club head during impact (as disclosed for example in U.S. Pat. No. 8,951,138).

Figure 3A:
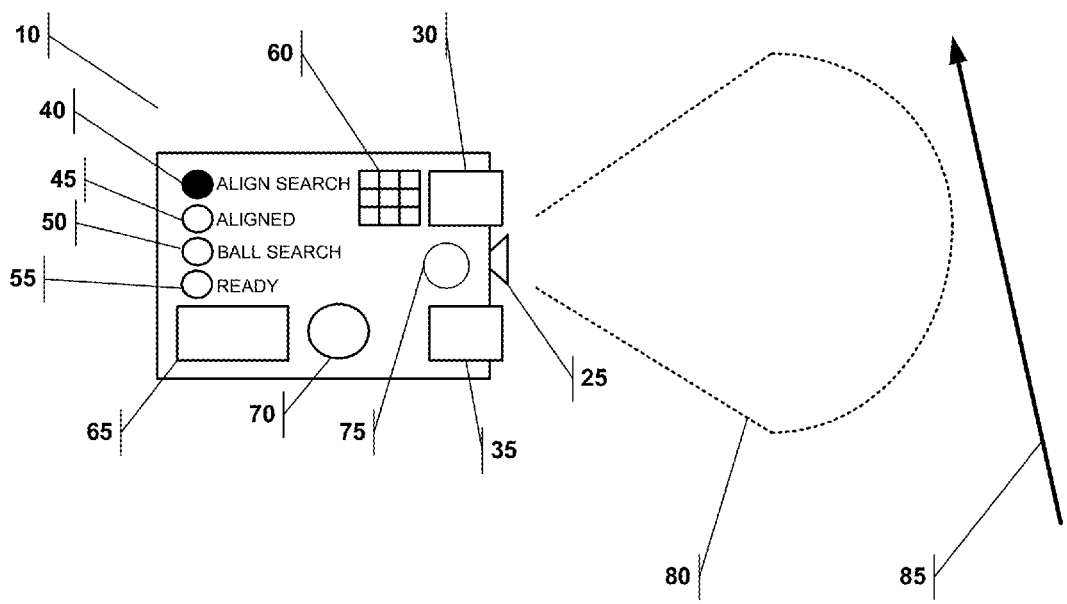
FIG. 3A illustrates the launch monitor awaiting the presentation of an alignment stick.
Figure 3B:
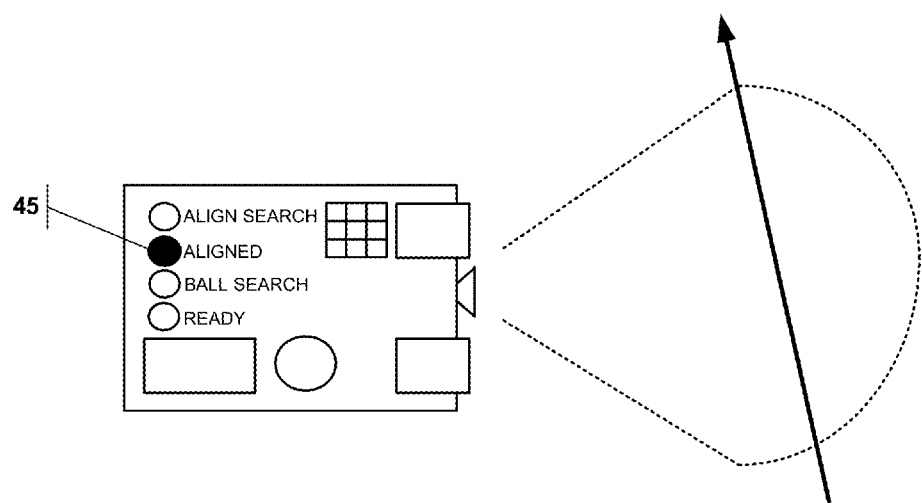
FIG. 3B illustrates the launch monitor detecting the alignment stick.
Figure 4A:
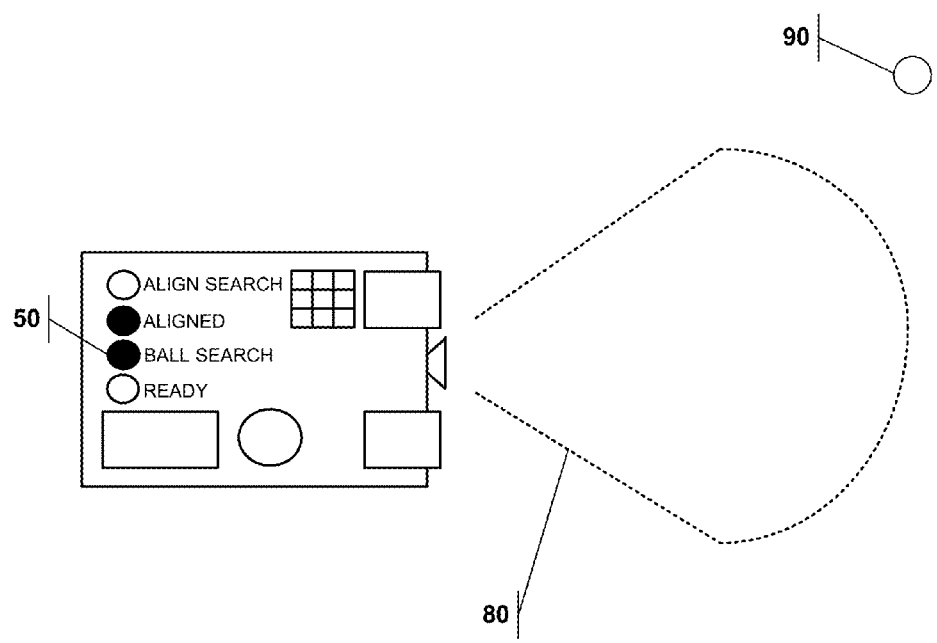
FIG. 4A illustrates the launch monitor awaiting the presentation of a golf ball.

Now turning to FIG. 3A, a method of target alignment from the golfer's perspective will be detailed. A launch monitor 10 is positioned in front of the area where the ball will be launched. In this particular embodiment, the sensor 25 has a sensor scan zone 80 in which the sensor 25 can detect objects. The launch monitor 10 illuminates the alignment search indicator 40 which indicates to the user to move an alignment stick 85 into the sensor scan zone 80. The system may automatically look for an alignment stick 85, or the user may activate an alignment mode directing the monitor 10 to detect the stick 85. In either case, the user would move the alignment stick 85 into the scan zone 80, with the stick 85 pointing at the target. Because the stick 85 is longer than the front face of the launch monitor 10, it can more precisely align with the target. The alignment stick 85 may be a stick used solely for the purpose of alignment. Such unique-purpose alignment sticks are already used as golf instruction aids and commonly found in a golfer's bag. A golf club can also be used as an alignment stick 85. Once the stick 85 is placed in the sensor scan zone 80, the monitor 10 detects the stick and performs the azimuth alignment correction calculations that will be used to correct the golf ball projectile calculations. This will be discussed more fully below with respect to FIGS. 5A and 5B. The launch monitor 10 may illuminate the aligned indicator 45 (FIG. 3B) notifying the user that the launch monitor 10 is now aligned and the user may now present a golf ball 90 as shown in FIG. 4A.

At this point, the user may leave the stick 85 undisturbed and then introduce a golf ball, or the user may remove the stick from the sensor scan zone 80 and the monitor 10 will store the just-calculated azimuth alignment angle offset for use in the ball flight trajectory calculations.

Figure 4B:
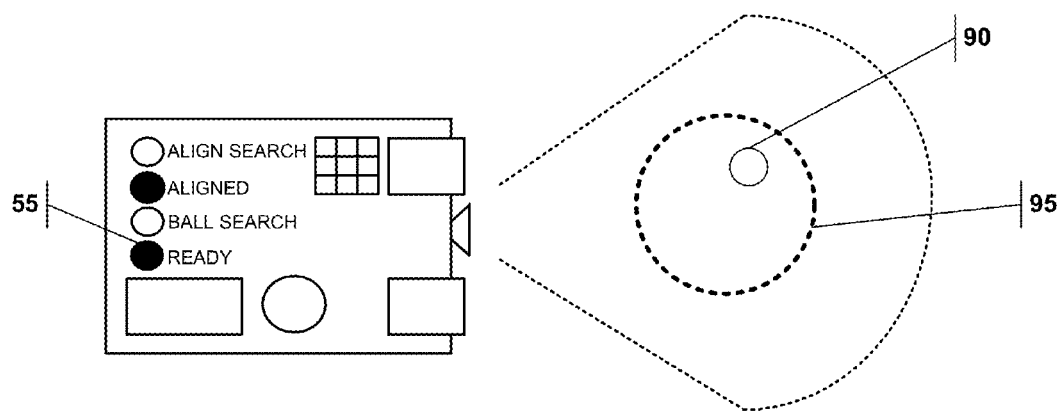
FIG. 4B illustrates the launch monitor detecting the golf ball.

Typically, the sensor 25 has speed and resolution characteristics set for properly identifying and measuring golf ball characteristics. Accordingly, in the sensor scan zone 80 the launch monitor 10 can reliably and robustly detect a golf ball. For example, as shown in FIG. 4A, golf ball 90 is outside the scan zone 80. The launch monitor 10 would not be able to reliably detect the presence of golf ball 90. The launch monitor 10 also has the ball search indicator 50 for presenting status information to the golfer. As illustrated in FIG. 4A, the launch monitor 10 is searching for the golf ball 90, but is unable to locate it. Accordingly, the golfer will manually move golf ball 90 to a position more directly in front of sensor 25. As soon as launch monitor 10 determines that golf ball 90 is within strike zone 65 as illustrated in FIG. 4B, the ready indicator light 55 show that the launch monitor 10 is ready for the golfer to hit the ball. It will be understood that other indicators may be used, such as an audible indicator, to indicate that the ball is in a proper strike zone. Once the ball 90 is in the strike zone 95, the golfer may launch the golf ball 90 down the driving range. The launch monitor 10 will detect when the golf ball 90 is launched, will measure speed and direction, as well as spin for the golf ball. The launch monitor 10 uses these measurements to present flight path information to the golfer, and such information may be corrected with the azimuth alignment angle corrections. This flight path information may be visually displayed on display 65, or may be audibly presented on speaker 70, or may be outputted to a separate computer system that may use the data as part of golf simulation game or training program. It may also be understood that the launch monitor 10 may be set up to indicate general pass or fail indicators according to defined limits for the golfer. In this way, a golfer can receive immediate and simple feedback on the quality of their last swing. A more thorough method and system of detecting the placement of the golf ball 90 and readying the device for capturing the launch parameters is disclosed in U.S. Pat. Nos. 7,641,565 and 7,497,780 by the same inventor of the present application and assigned to the same assignee as the present application. While the launch monitor 10 has been described with indicators 40, 45, 50 and 55, the indication/notification/instructions may be instead conveyed to the user by the display 65 and/or the speaker 70.

Figure 5A:
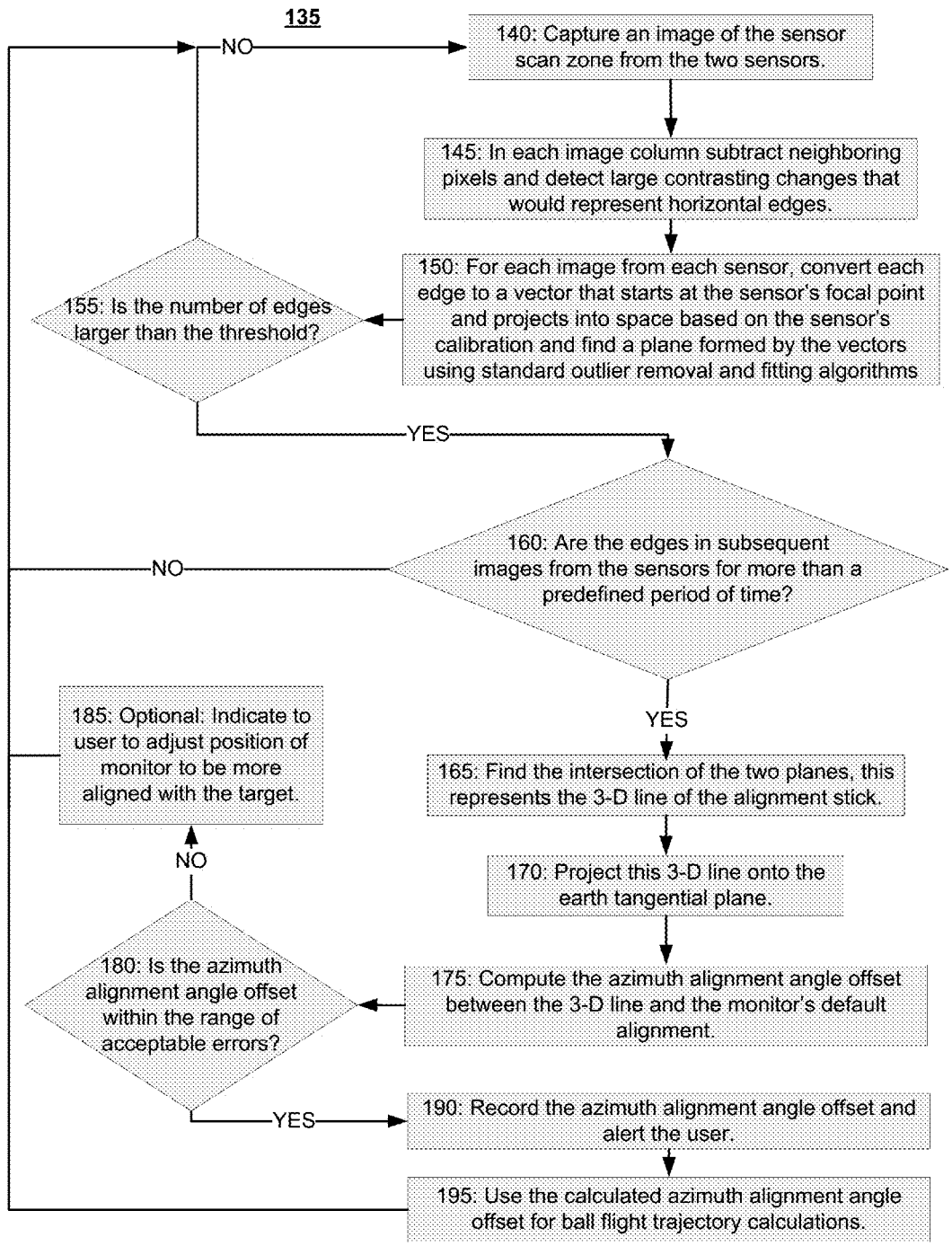
FIG. 5A is a flowchart detailing the method for detecting the alignment stick and calculating an azimuth alignment correction for a multi-sensor monitor.
Figure 5B:
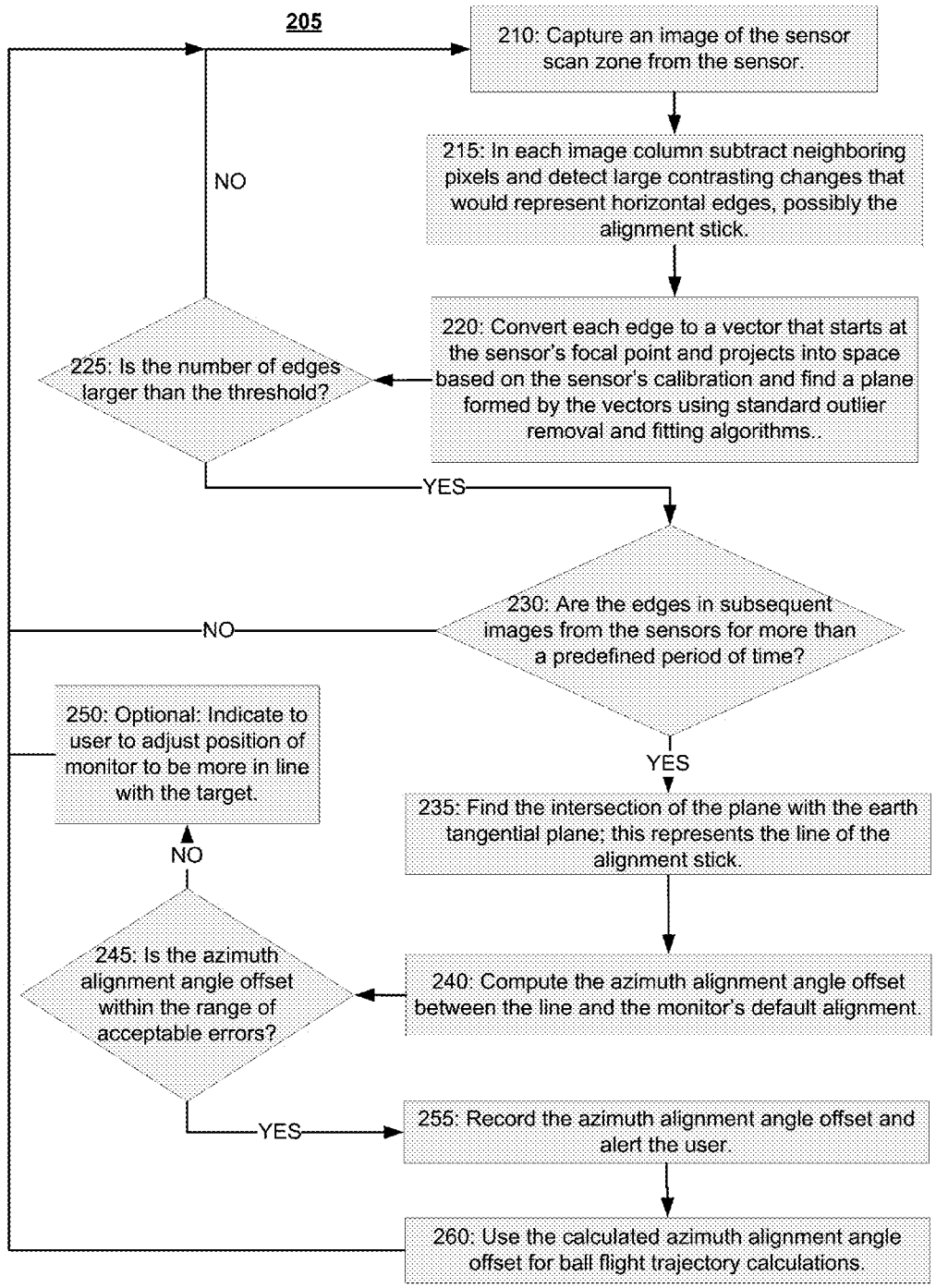
FIG. 5B is a flowchart detailing the method for detecting the alignment stick and calculating an azimuth alignment correction for a single sensor monitor.
Figure 6:
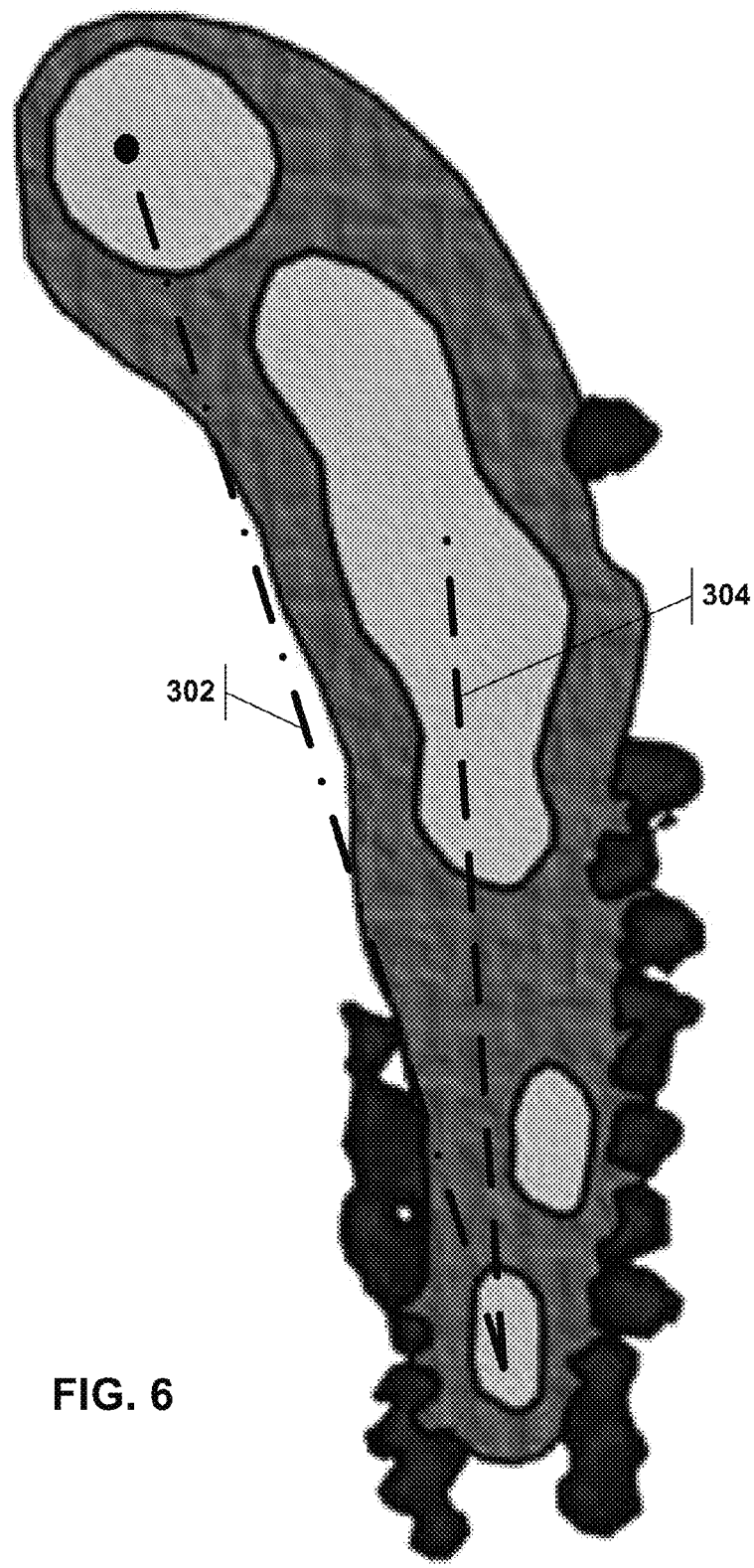
FIG. 6 is a top view of a golf course hole with two different target headings.

With reference to FIGS. 5A and 5B, methods to detect the align stick and performs the alignment correction calculations will now be detailed. As described above with reference to FIGS. 3A and 3B, the sensor 25 system scans the strike zone for the introduction of an alignment stick 85. The processor 15 analyzes the images from the sensor to detect the presence or absence of an alignment stick 85. The detection of the alignment stick 85 is aided by the following known conditions: the alignment stick 85 is long and straight, the alignment stick 85 contrasts with the background which is typically grass or a mat, and optionally, the stick 85 will be presented in an orientation that is relatively well known relative to the launch monitor 10. This last known condition is derived from the fact that the golfer has placed the launch monitor 10 in a orientation that is roughly aligned to the target. After the alignment stick 85 has been detected, the processor 15 verifies that the stick 85 has been in the same location for a predefined time period and records the orientation and alerts the user that the monitor is aligned and ready to record a ball launch.

In a preferred embodiment, the alignment stick 85 is detected by two separate sensors to find the 3D line formed by the stick but is also possible to use a single sensor at reduced measurement accuracy. The sensors may be calibrated such that their lens distortion and relative locations to each other are known. Because of this calibration, the system knows for each pixel an associated vector that begins from the sensor focal point and emanates out. For the embodiment described here the launch monitor 10 is located as shown of FIG. 1 at a generally right angle to the shot trajectory. The sensors 25 capture images of the strike zone at a predefined period. When the alignment stick 85 is presented, the stick 85 appears generally horizontal in the sensor scan zone. The processor 15 performs the following method 135 (FIG. 5A):

a. Step 140: Capture an image of the sensor scan zone from the two sensors.

b. Step 145: For each image from each sensor, in each image column subtract neighboring pixels and detect large contrasting changes that would represent horizontal edges.

c. Step 150: For each image from each sensor, convert each edge to a vector that starts at the sensor's focal point and projects into space intersecting the edge based on the sensor's calibration and find a plane formed by the vectors using standard outlier removal and fitting algorithms.

d. Step 155: Determine if there are a sufficient number of edges to continue processing. If there are an insufficient number of edges, return to step 140. This step helps ensure that the image is not picking up an artifact or other object that is not of sufficient bulk to be the expected alignment stick 85. For a particular embodiment average spatial resolution is known over the full strike zone. With this information the size of typical objects that would be in the field of view such as balls, clubs or shoes can be determined. Since the stick is long and alignment is general known (horizontally in the preferred embodiment) then a number of points significantly larger to known objects can be used. For example since a ball is known to be 1.68 inches and club heads are generally 3 to 5 inches then a contiguous number of points equivalent to 12 inches or more may be appropriate on which to set this threshold.

e. Step 160: If there are sufficient number of edges, determine if the edges remains in the subsequent images from the sensors for a predefined period of time. This helps ensure that the horizontal object that is the sensors scan zone is indeed intended to be there and is most likely the expected alignment stick 85. In the preferred embodiment, the predefined period of time is at least 0.5 seconds.

f. Step 165: Find the intersection of the two planes, this represent the 3-D line of the alignment stick.

g. Step 170: Project this 3-D line onto the earth tangential plane—i.e., the top view as shown in FIG. 1. The monitor's tilt sensor 78 may be used to more accurately determine earth tangential, thus refining the ultimate calculation of the azimuth alignment angle offset.

h. Step 175: Compute the azimuth alignment angle offset 110 between the 3-D line and the natural orientation of the launch monitor coordinate system—i.e., the monitor's default alignment 105.

i. Step 180: Determine if the azimuth alignment angle offset is within a predefined range of azimuth angles. In the preferred embodiment the range of angles is +/−20 degrees from the monitor's default alignment. If not, return to step 140. This step checks whether the object that may be detected is not an alignment stick at all. For example, the user may inadvertently lay a golf club down, which may be so far out of alignment with the natural orientation of the launch monitor coordinate system that the system can assume that it is not intended to be used for alignment. Optionally, in step 185, the monitor could indicate to the user to adjust position of monitor to be more in line with the target. This may be helpful if the user's initial placement of the monitor is too far out of alignment, resulting in a large correction factor. In stereoscopic image processing, the closer the true heading is to the natural orientation of the launch monitor coordinate system the more accurate the calculation of the azimuth alignment angle offset.

j. Step 190: Record the azimuth alignment angle offset and alert the user.

k. Step 195: Use the calculated azimuth alignment angle offset for ball flight trajectory calculations.

l. Optionally, return to step 140 and search the images from the sensors for the presence of an alignment stick, if none is found, then continue using the last alignment angle offset for ball flight trajectory calculations.

Another technique for locating the plane that contains the stick is to find the intersection of the vectors found in step 150 with an arbitrary plane in the sensor calibration space. The plane can be anywhere but it is best if it is generally orthogonal to the vectors projecting from the sensor and is located on one of the system calibration coordinate frame axes. Once the vectors have been converted to 2D points in the arbitrary plane then the problem of outlier removal and line fitting becomes much easier. Once the line fit has been done then the plane containing the stick is formed by any two points on the line just found and the focal point of the sensor.

Another method that can be used is to locate a line directly in the captured image using standard outlier removal and line fitting techniques. This method works if the lens is rectifier and has low distortion. In a system with high distortion the stick will appear curved and finding the line may be difficult. After finding the line in sensor pixels space and two points on the line can be projected into 3D space to find the plane containing the stick.

The method may also calculate the relative elevation offset of the monitor 10. Using the information from step (165) above, the method can project this 3-D line onto a plane that is orthogonal to the earth tangential plane. Then an elevation alignment angle offset can be calculated between the 3-D line and the monitor's default alignment. While the default alignment has been described above with respect to azimuth, the default alignment may also include natural level orientation (i.e., horizontal alignment) of the launch monitor coordinate system. This may be advantageous when the monitor does not have a tilt sensor. In this case, the monitor may not only calculate the azimuth alignment angle offset but also the elevation alignment angle offset. These calculated offsets may be use to better model the ball flight trajectory, resulting in more accurate ball flight calculations.

As mentioned above, the monitor may be programmed to automatically search the sensor's images for an object that may be an alignment stick. Upon power up the monitor may default to the natural orientation of the launch monitor coordinate system—i.e., the monitor's default alignment 105, or may illuminate an indicator requesting that the user present an alignment stick so that an alignment error may be calculated and used in ball flight trajectory calculations.

The method just described may be modified for a monitor with a single sensor. The steps for such a method 205 are diagrammed in FIG. 5B and include:

a. Step 210: Capture an image of the sensor scan zone from the sensor.

b. Step 215: Detecting a horizontal edge within the image representative of the alignment stick by detecting large contrast changes.

c. Step 220: Convert each edge to a vector that starts at the sensor's focal point and projects into space intersecting the edge based on the sensor's calibration and find a plane formed by the vectors using standard outlier removal and fitting algorithms.

d. Step 225: Determine if there are a sufficient number of edges to continue processing. If there are an insufficient number of edges, return to step 210. This step helps ensure that the image is not picking up an artifact or other object that is not of sufficient bulk to be the expected alignment stick 85.

e. Step 230: Determine if the detected object remains in the subsequent images from the sensor for a predefined period of time.

f. Step 235: Find the intersection of the plane with the earth tangential plane; this represents the line of the alignment stick.

g. Step 240: Calculating an azimuth alignment angle offset based on the line and the monitor's default alignment.

h. Step 245: Determine if the azimuth alignment angle offset is within a predefined range of azimuth angles. If not, return to step 210. Optionally, in step 250, the monitor could indicate to the user to adjust position of monitor to be more in line with the target.

i. Step 255: Record the azimuth alignment angle offset and alert the user.

j. Step 260: Use the calculated azimuth alignment angle offset for ball flight trajectory calculations.

k. Optionally, return to step 210 and search the images from the sensor for the presence of an alignment stick, if none is found, then continue using the last alignment angle offset for ball flight trajectory calculations.

An added benefit to using the system and method described herein is that the monitor need not be moved when different targets are being selected. For example, in FIG. 6 a golfer with a lower handicap may attempt to hit the green with a single stroke, and would thus align the monitor along target line 302. Whereas a higher handicap golfer may prefer to reach the green in two stokes, the first stroke reaching the middle of the fairway. Thus, this golfer may align the monitor along target line 304. Simply presenting the alignment stick 85 in a slightly different orientation would allow the monitor 10 to align to both targets without moving the monitor 10.

Figure 7A:
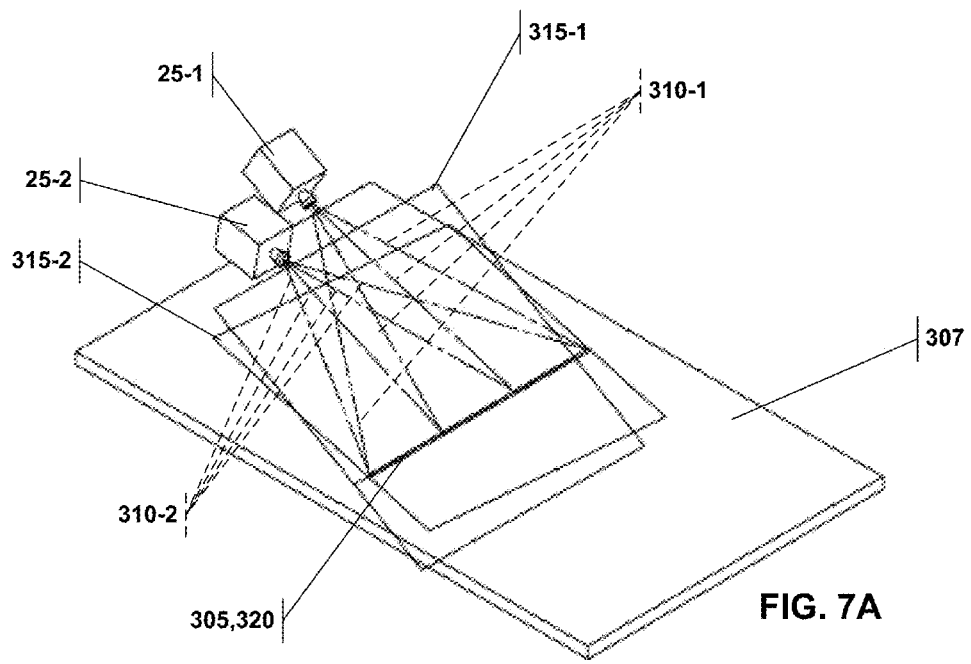
FIG. 7A is a top right perspective view of the system with two sensors.
Figure 7B:
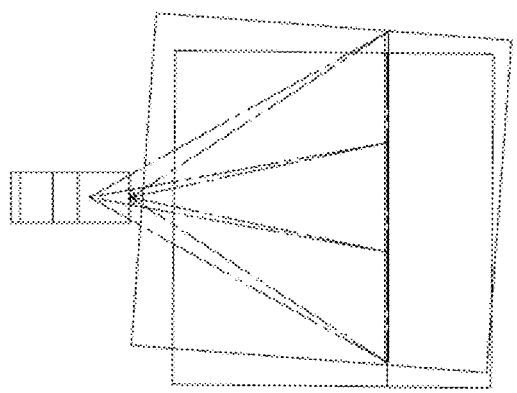
FIG. 7B is a top plan view of the system with two sensors.
Figure 7C:
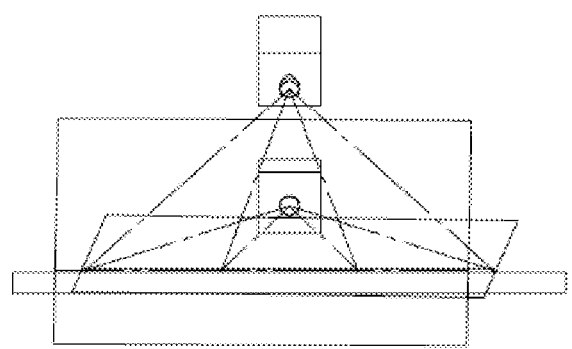
FIG. 7C is front view of the system with two sensors.
Figure 7D:
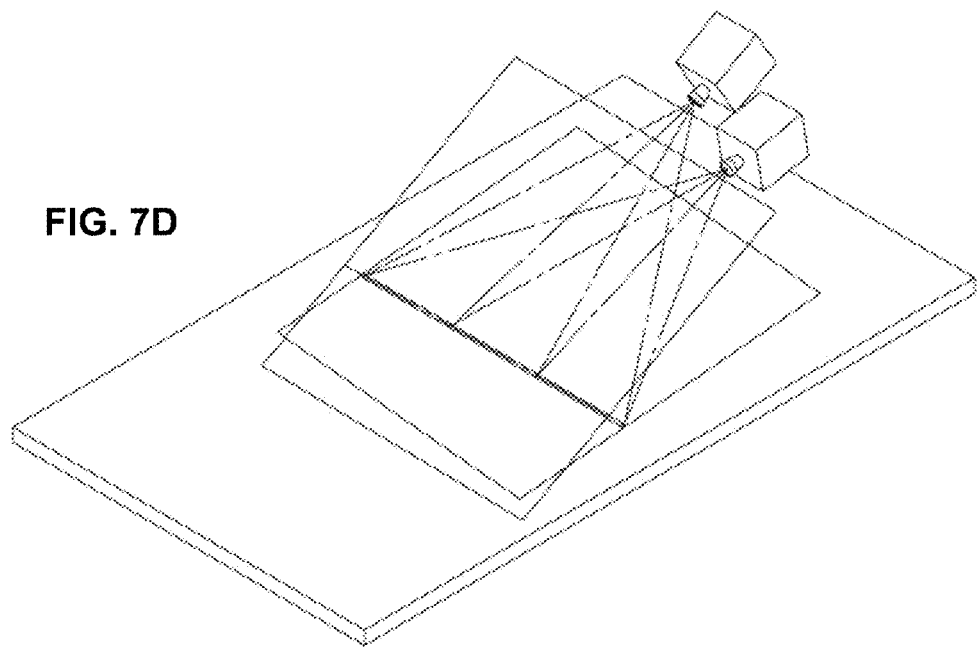
FIG. 7D is a top left perspective view of the system with two sensors.
Figure 7E:
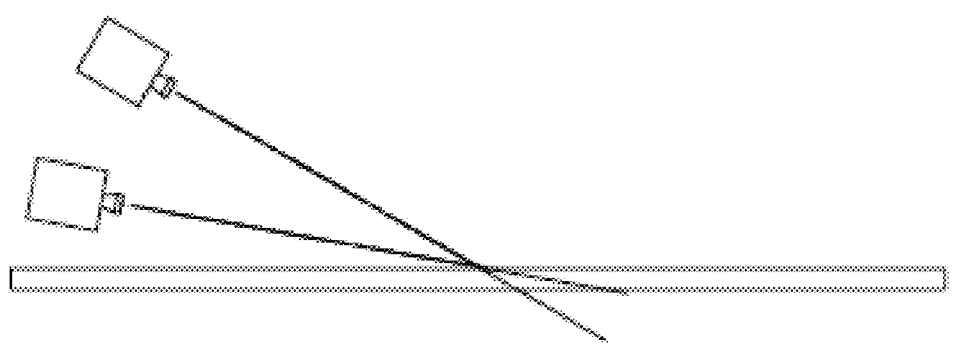
FIG. 7E is a side view of the system with two sensors.

FIGS. 7A through 7E illustrate the use of the sensors' known calibration to create planes that may be used to calculate the azimuth alignment angle offset and the relative elevation offset. FIG. 7A is a top right perspective of the system showing two image sensors 25-1 and 25-2. The sensors (25-1, 25-2) detect a horizontal edge 305 that is representative of the alignment stick placed on the ground 307 (see step 145). Then based on the first sensor's 25-1 calibration, a number of vectors (310-1) beginning at the first sensor's 25-1 focal point projects into space intersecting the horizontal edge 305 (see step 150). Based on the vectors 310-1, the system can determine a first plane 315-1 (see step 150). This is repeated for the second sensor 25-2, with vectors 310-2 used to determine a second plane 315-2. The intersection of those two planes 320 represents the 3-D line of the alignment stick (see step 165). This intersection is projected onto earth tangential (generally the ground 307) as shown in FIG. 7B, and the azimuth alignment angle offset calculated. The intersection can also be projected onto a plane that is orthogonal to the earth tangential plane as shown in FIG. 7C, and the relative elevation offset calculated. FIGS. 7D and 7E are a top left perspective view and a side view, respectively, that are not labeled to more clearly show the first and second planes and the vectors.

The above description of the disclosed example embodiments is provided to enable any person skilled in the art to make or use the invention. Various modifications to these example embodiments will be readily apparent to those skilled in the art, and the generic principles described herein can be applied to other example embodiments without departing from the spirit or scope of the invention. Thus, it is to be understood that the description and drawings presented herein represent a presently preferred example embodiment of the invention and are therefore representative of the subject matter which is broadly contemplated by the present invention. It is further understood that the scope of the present invention fully encompasses other example embodiments that may become obvious to those skilled in the art and that the scope of the present invention is accordingly limited by nothing other than the appended claims.

The invention claimed is:

1. A golf ball launch monitor to be used with an alignment stick, the monitor comprising:
   a default alignment;
   at least two image sensors each adapted to capture an image of the alignment stick and communicate that image to a processor, each sensor has a known calibration;
   a processor configured to perform the following steps;
   a. for each image from each sensor, detect horizontal edges within the images representative of the alignment stick by detecting large contrast changes;
   b. for the first sensor: (1) convert each edge to a vector that starts at the first sensor and projects into space based on the first sensor's calibration; and (2) locate a first plane formed by the vectors by applying an outlier removal and best fit analysis;
   c. for the second sensor: (1) convert each edge to a vector that starts at the second sensor and projects into space based on the second sensor's calibration; and (2) locate a second plane formed by the vectors by applying an outlier removal and best fit analysis;
   d. determine the intersection of the first and second planes;
   e. calculate an azimuth alignment angle offset based on the intersection and the default alignment.

2. The monitor of claim 1, wherein the steps performed by the processor further comprise:
   f. determine if the set of edges detected in step (a) is greater than a predefined threshold;
   g. if the determination of step (f) is affirmative, then calculate ball flight trajectory calculations based on the azimuth alignment angle offset calculated in step (e).

3. The monitor of claim 2, further comprising a button constructed to transmit a signal to the processor, wherein the processor awaits the signal before beginning steps (a)-(e).

4. The monitor of claim 1, wherein the steps performed by the processor further comprise:
   f. determine if the azimuth alignment angle offset calculated in step (e) is within a predefined range;
   g. if the determination of step (f) is affirmative, then calculate ball flight trajectory calculations based on the azimuth alignment angle offset calculated in step (e).

5. The monitor of claim 4, wherein the predefine range is +/−20 degrees from the default alignment.

6. The monitor of claim 1, wherein the steps performed by the processor further comprise:
   f. perform step (a) for multiple images over a predetermined period of time;
   g. determine if the edges detected in step (a) are present for the multiple images;
   h. if the determination of step (g) is affirmative, then calculate ball flight trajectory calculations based on the azimuth alignment angle offset calculated in step (e).

7. The monitor of claim 6, wherein predetermine period of time is at least 0.5 seconds.

8. The monitor of claim 1, wherein the steps performed by the processor further comprise:
   f. calculate ball flight trajectory calculations based on the azimuth alignment angle offset.

9. The monitor of claim 1, further comprising:
   an information output device selected from the group consisting of an indicator, a display, and a speaker;
   the steps performed by the processor further comprise:
   f. activate the information output device after the azimuth alignment angle offset has been calculated.

10. The monitor of claim 1, further comprising a tilt sensor connected to the processor, the tilt sensor generates an alignment offset based on the orientation of the monitor relative to earth tangential, and the processor calculates the azimuth alignment angle offset based on the alignment offset.

11. The monitor of claim 1, wherein the default alignment comprises a horizontal alignment, and the steps performed by the processor further comprise:
    f. project the intersection of step (d) onto a plane that is orthogonal to the earth tangential plane;
    g. calculate an elevation alignment angle offset based on the intersection and the horizontal alignment.

12. The monitor of claim 1, wherein the steps performed by the processor further comprise:
    f. if the processor cannot detect horizontal edges within the images representative of the alignment stick in step (a), the processor uses the last calculated azimuth alignment angle offset to calculate ball flight trajectory calculations.

13. The monitor of claim 1, wherein the alignment stick is a retroreflective stick or a golf club shaft.

14. A golf ball launch monitor to be used with an alignment stick, the monitor comprising:
    a default alignment;
    an image sensor adapted to capture an image of the alignment stick and communicate that image to a processor, the image sensor having a known calibration;
    a processor configured to perform the following steps;
    a. detect horizontal edges within the images representative of the alignment stick by detecting large contrast changes;
    b. convert each edge to a vector that starts at the sensor and projects into space based on the sensor's calibration;
    c. locate a plane formed by the vectors by applying an outlier removal and best fit analysis;

d. determine the intersection between the plane and an earth tangential plane;

e. calculate an azimuth alignment angle offset based on the intersection and the default alignment.

15. The monitor of claim 14, wherein the steps performed by the processor further comprise:

f. determine if the set of edges detected in step (a) is greater than a predefined threshold;

g. if the determination of step (f) is affirmative, then calculate ball flight trajectory calculations based on the azimuth alignment angle offset calculated in step (e).

16. The monitor of claim 15, further comprising a button constructed to transmit a signal to the processor, wherein the processor awaits the signal before beginning steps (a)-(f).

17. The monitor of claim 14, wherein the steps performed by the processor further comprise:

f. determine if the azimuth alignment angle offset calculated in step (e) is within a predefined range;

g. if the determination of step (f) is affirmative, then calculate ball flight trajectory calculations based on the azimuth alignment angle offset calculated in step (e).

18. The monitor of claim 17, wherein the predefine range is +/−20 degrees from the default alignment.

19. The monitor of claim 14, wherein the steps performed by the processor further comprise:

f. perform step (a) for multiple images over a predetermined period of time;

g. determine if the edges detected in step (a) are present for the multiple images;

h. if the determination of step (g) is affirmative, then calculate ball flight trajectory calculations based on the azimuth alignment angle offset calculated in step (e).

20. The monitor of claim 19, wherein predetermine period of time is at least 0.5 seconds.

21. The monitor of claim 14, wherein the steps performed by the processor further comprise:

f. calculate ball flight trajectory calculations based on the azimuth alignment angle offset.

22. The monitor of claim 14, further comprising:

an information output device selected from the group consisting of an indicator, a display, and a speaker;

the steps performed by the processor further comprise:

f. activate the information output device after the azimuth alignment angle offset has been calculated.

23. The monitor of claim 14, wherein the steps performed by the processor further comprise:

f. if the processor cannot detect horizontal edges within the images representative of the alignment stick in step (a), the processor uses the last calculated azimuth alignment angle offset to calculate ball flight trajectory calculations.

24. The monitor of claim 14, wherein the alignment stick is a retroreflective stick or a golf club shaft.

* * * * *